United States Patent [19]
Götz

[11] 4,081,195
[45] Mar. 28, 1978

[54] MOTOR VEHICLES WITH STEPPED REAR SECTIONS

[75] Inventor: Hans Götz, Boblingen, Germany

[73] Assignee: Daimler-Benz Aktiengesellschaft, Germany

[21] Appl. No.: 713,582

[22] Filed: Aug. 11, 1976

[30] Foreign Application Priority Data

Aug. 12, 1975 Germany .............................. 2535882

[51] Int. Cl.² ............................................ B62D 35/00
[52] U.S. Cl. .................................. 296/1 S; 296/137 R
[58] Field of Search .................. 296/1 S, 137 R, 137 J

[56] References Cited
U.S. PATENT DOCUMENTS

| 2,643,912 | 6/1953 | Lyon | 296/137 R |
| 3,672,718 | 6/1972 | Broyer | 296/1 S |
| 3,807,787 | 4/1974 | Götz | 296/1 S |

*Primary Examiner*—Philip Goodman
*Attorney, Agent, or Firm*—Craig & Antonelli

[57] ABSTRACT

A motor vehicle with a stepped rear section and with a shield-like guide installation extending in continuation of the roof up to the area of the rear window, which — matched to the outer contour of the rear window — surrounds at least the upper half thereof.

7 Claims, 4 Drawing Figures

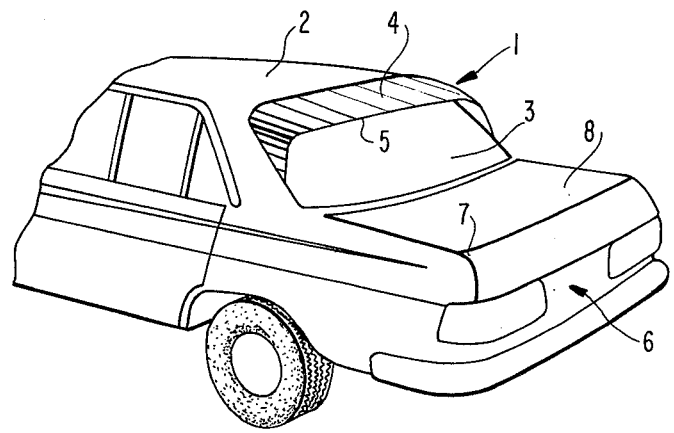
FIG 1
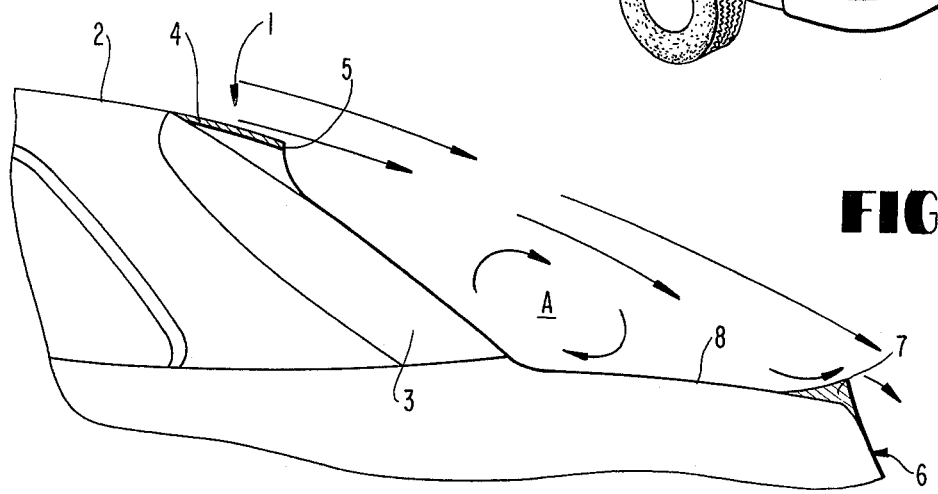
FIG 2
FIG 3
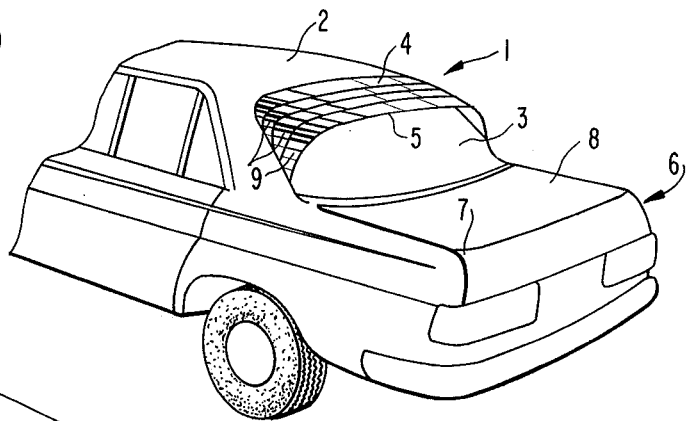
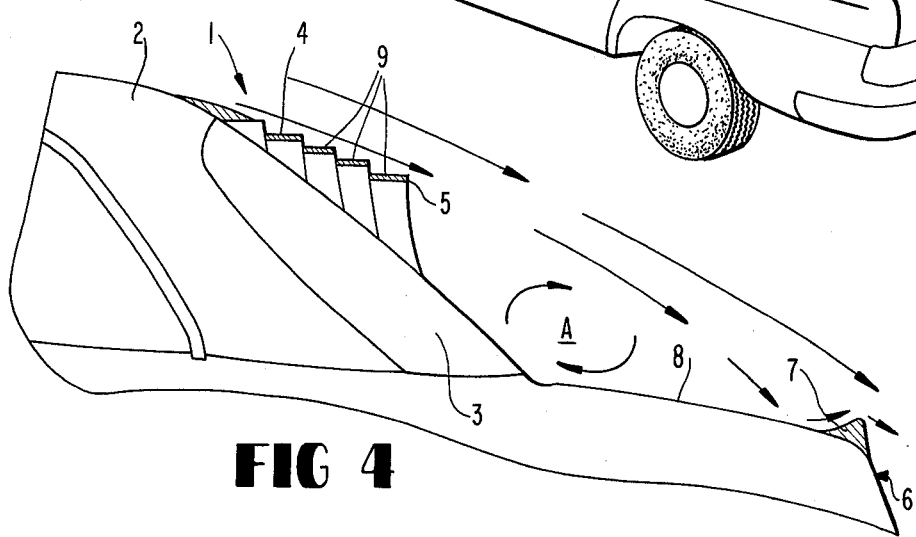
FIG 4

MOTOR VEHICLES WITH STEPPED REAR SECTIONS

The present invention relates to a motor vehicle with a stepped rear section and with a shield-like guide installation extending in continuation of the roof up to the area of the rear windowpane.

A shield-like roof construction is described already in U.S. Pat. No. 2,643,913 which shrouds or projects over all vehicle window surfaces in order to prevent entry into the vehicle of far-reachingly direct sun rays. Furthermore, a cooling air stream is to be produced by this roof shape during the drive, which is intended to protect the vehicle passenger space against a heating-up by the sun rays.

However, edge or tip vortexes are induced by such a roof shell, which considerably increase the overall air-resistance and the lift forces of the vehicle.

It is the aim of the present invention to provide a guide installation for stepped rear sections of motor vehicles extending in continuation of the roof up to the area of the rear windowpane, which fits-in harmonically into the overall picture and appearance of the motor vehicle, and which produces a predetermined air stream especially under avoidance of edge or tip vorteces, from which results an improved air resistance coefficient.

This is achieved in a motor vehicle of the type described hereinabove in that according to the present invention the guide installation — matched to the outer contour of the rear window — surrounds at least the upper half thereof.

In a preferred embodiment of the present invention, the guide installation includes in its upper area a curvature increasingly convex in the direction toward the terminal edge thereof.

The visibility toward the rear is reduced only insignificantly even with the use of a guide installation consisting of an opaque material if the guide installation is composed of lamellae-like partial elements.

The air-resistance coefficient receives a further improvement if a spoiler arranged upstream of vehicle rear-section surface is coordinated to the guide installation, whereby the improvement of the air resistance becomes greater than produces the addition of the individual air-resistance improvements, i.e., guide installation and rear spoiler, thus producing a synergistic effect.

Accordingly, it is an object of the present invention to provide a motor vehicle with a stepped rear section which avoids by simple means the aforementioned shortcomings and drawbacks encountered in the prior art.

Another object of the present invention resides in a motor vehicle with a stepped rear section equipped with a sun protection shield or screen, in which tip vorteces are effectively avoided while the overall resistance and lift forces are decreased.

A still further object of the present invention resides in a motor vehicle with a stepped rear section in which a guide installation extending in continuation of the roof up to the area of the rear window fits-in harmonically into the overall appearance of the motor vehicle.

Another object of the present invention resides in a motor vehicle of the type described above which exhibits an improved air-resistance coefficient.

These and other objects, features and advantages of the present invention will become more apparent from the following description when taken in connection with the accompanying drawing which shows, for purposes of illustration only, several embodiments in accordance with the present invention, and wherein:

FIG. 1 is a perspective view of a motor vehicle rear area with a guide installation according to the present invention having a smooth structure and mounted above the rear window;

FIG. 2 is a partial side elevational view, on an enlarged scale, of the embodiment according to FIG. 1, with the guide installation shown in cross section;

FIG. 3 is a perspective, similar to FIG. 1, of a motor vehicle rear section provided with a guide installation according to the present invention constructed in a lamellae-like manner; and FIG. 4 is a side elevational view of FIG. 3 with the guide installation thereof illustrated in cross section.

Referring now to the drawing wherein like reference numerals are used throughout the various views to designate like parts, a stepped rear area of a motor vehicle, not illustrated in detail, includes a screen-like or shield-like guide installation generally designated by reference numeral 1 which extends in continuation of the roof 2 and — matched to the outer contour of the rear window 3 — surrounds at least the upper half thereof. Within its upper area 4, the guide installation 1 has a convex curvature increasing in the direction toward its rear terminal edge 5.

A spoiler 7 is arranged in front of the rear surface 6 forming the rear end of the motor vehicle, which is either mounted on the lugged space lid 8 or may also be formed out of the same.

Whereas in the embodiment according to FIGS. 1 and 2, the guide installation 1 has a continuous, uninterrupted surface, the guide installation 1 according to FIGS. 3 and 4 is composed of lamellae-like partial members 9 which are so directed that the visibility toward the rear is limited least.

The guide installation 1 which extends as continuation of the roof and rear column surface at the circumference of the rear window 3, effects above all a tapering of the vehicle top or superstructure in the direction toward the rear which is favorable from a streamlining point of view. A considerably greater improvement of the air-resistance coefficient is achieved in conjunction with a spoiler 7 than would be expected from the mere addition of the individual improvements because — as indicated in FIGS. 2 and 4 — the magnitude of the detaching bubble indicated by "A" is considerably reduced in contrast to stepped rear section motor vehicles without the construction in accordance with the present invention.

The guide installation 1 which may consist, for example, of a highly transparent or also colored, synthetic plastic (resinous) material of any conventional type, can be used simultaneously as sun-protection, by means of which a reduction of the sun-heat radiated into the passenger space by way of the rear window 3 can be achieved up to approximately 50%.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. A motor vehicle with a rear section having a roof and a rear window, and means for producing a predetermined air stream for reducing vorticization in the area of the rear window, said means for producing a predetermined air stream comprising a convex screen-like guide means extending in continuation of the roof outwardly from the area of the perimeter of the rear window and overlying a portion of the rear window, characterized in that the convex guide means surrounds at least approximately the upper half of the perimeter of the rear window and has at least an edge conforming in shape thereto.

2. A motor vehicle according to claim 1, characterized in that the guide means has in its upper areas an increasingly convex curvature in the direction toward its terminal edge.

3. A motor vehicle according to claim 2, characterized in that the guide means is composed of lamellae-like partial members.

4. A motor vehicle according to claim 3, characterized in that a spoiler connected ahead of the vehicle rear surface is coordinated to the guide means.

5. A motor vehicle according to claim 1, characterized in that the guide means is composed of lamellae-like partial members.

6. A motor vehicle according to claim 1, characterized in that a spoiler connected ahead of the vehicle rear surface is coordinated to the guide means.

7. A motor vehicle according to claim 3, wherein said lamellae-like partial members are arranged in a step-like manner.

* * * * *